US012654697B2

(12) United States Patent
Jin et al.

(10) Patent No.: US 12,654,697 B2
(45) Date of Patent: Jun. 16, 2026

(54) LONGITUDINAL MOTION PROFILE GENERATION AND CONTROL FOR ACHIEVING PERFORMANCE TARGETS

(71) Applicant: GM GLOBAL TECHNOLOGY OPERATIONS LLC, Detroit, MI (US)

(72) Inventors: Ning Jin, Novi, MI (US); Paul Guillermo Otanez, Franklin, MI (US); Todd P. Lindemann, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 18/395,807

(22) Filed: Dec. 26, 2023

(65) Prior Publication Data

US 2025/0206301 A1     Jun. 26, 2025

(51) Int. Cl.
*B60W 30/14*          (2006.01)

(52) U.S. Cl.
CPC ....... *B60W 30/143* (2013.01); *B60W 2520/10* (2013.01); *B60W 2520/105* (2013.01); *B60W 2552/30* (2020.02); *B60W 2720/10* (2013.01); *B60W 2720/103* (2013.01); *B60W 2720/106* (2013.01)

(58) Field of Classification Search
CPC ........... B60W 30/143; B60W 2520/10; B60W 2520/105; B60W 2552/30; B60W 2720/10; B60W 2720/106; B60W 2720/103
See application file for complete search history.

(56) References Cited

U.S. PATENT DOCUMENTS

| | | | |
|---|---|---|---|
| 2009/0050593 A1* | 2/2009 | Ladra | B66C 13/063 |
| | | | 212/275 |
| 2013/0085655 A1 | 4/2013 | Kii et al. | |
| 2019/0227550 A1* | 7/2019 | Yershov | G05D 1/0088 |

(Continued)

FOREIGN PATENT DOCUMENTS

| | | |
|---|---|---|
| DE | 60301587 T2 | 6/2006 |
| DE | 102009058393 A1 | 9/2010 |

(Continued)

OTHER PUBLICATIONS

DE102015218166 english translation (Year: 2017).*

(Continued)

*Primary Examiner* — Anne Marie Antonucci
*Assistant Examiner* — Nicholas Patrick Langhorne

(57) ABSTRACT

A motion system for a vehicle includes: a profile generation module configured to obtain a current reference velocity, a current reference acceleration, a target velocity and a target acceleration for the vehicle, and based on the current reference velocity, current reference acceleration, target velocity and target acceleration, to generate a speed profile including determining a first nonlinear section and second nonlinear section of the speed profile, where the first nonlinear section is associated with acceleration, where the second nonlinear section is associated with deceleration, and where the speed profile includes acceleration of the vehicle from the current reference velocity to the target velocity; and a vehicle motion control module configured, based on the speed profile, to control one or more actuators of the vehicle.

20 Claims, 6 Drawing Sheets

(56)  References Cited

U.S. PATENT DOCUMENTS

| | | | |
|---|---|---|---|
| 2019/0283766 A1 | 9/2019 | Jensen et al. | |
| 2020/0070849 A1* | 3/2020 | Suzuki | B60W 50/12 |
| 2021/0048818 A1* | 2/2021 | Funke | G05D 1/617 |
| 2021/0276550 A1 | 9/2021 | Gotou et al. | |
| 2022/0227237 A1* | 7/2022 | Otanez | B60W 10/184 |
| 2023/0034858 A1 | 2/2023 | Gloceri et al. | |

FOREIGN PATENT DOCUMENTS

| | | | | |
|---|---|---|---|---|
| DE | 102015218166 A1 * | 3/2017 | ......... | B60W 30/143 |
| DE | 112019003322 B4 | 1/2023 | | |
| KR | 20230021323 A * | 2/2023 | ............... | H02P 8/14 |
| WO | WO-2021121913 A1 * | 6/2021 | ......... | B60W 30/143 |

OTHER PUBLICATIONS

KR20230021323 english translation (Year: 2023).*
WO2021121913 english translation (Year: 2021).*
German Office Action from counterpart DE1020241036338, dated Jul. 25, 2024.

* cited by examiner

LONGITUDINAL MOTION PROFILE GENERATION AND CONTROL FOR ACHIEVING PERFORMANCE TARGETS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle motion requesting and controlling systems operating based on requests from multiple requestors.

A host vehicle can include various motion control systems for assisting a driver when performing, for example, partially or fully autonomous operations. For example, a host vehicle may include a cruise control system, an adaptive cruise control system, a hands-free driving system, a one-pedal drive system, etc. Each of these systems provide at least some level of speed and acceleration (or deceleration) control assistance as well as other assistance. The cruise control and adaptive cruise control systems operate to maintain a set speed. The adaptive cruise control system also operates to maintain a safe distance from a vehicle forward of the host vehicle. The hands-free driving system operates to autonomously drive the host vehicle on, for example, a freeway including controlling speed, acceleration, deceleration, and steering of the host vehicle. The one-pedal drive system operates to automatically decelerate the host vehicle when a vehicle operator releases an accelerator pedal. The host vehicle may automatically apply the brakes without the driver pressing on a brake pedal.

SUMMARY

A motion system for a vehicle is disclosed. The motion system includes: a profile generation module configured to obtain a current reference velocity, a current reference acceleration, a target velocity and a target acceleration for the vehicle, and based on the current reference velocity, current reference acceleration, target velocity and target acceleration, as well as acceleration constraints (e.g., minimum and maximum constraints) and jerk constraints (e.g., minimum and maximum constraints), to generate a speed profile including determining a first nonlinear section and second nonlinear section of the speed profile, where the first nonlinear section is associated with acceleration or deceleration, where the second nonlinear section is associated with deceleration or acceleration, and where the speed profile includes acceleration of the vehicle from the current reference velocity to the target velocity; and a vehicle motion control module configured, based on the speed profile, to control one or more actuators of the vehicle.

In other features, the first nonlinear section is a first quadratic function and the second nonlinear section is a second quadratic function different than the first quadratic function with opposite sign of jerk constraint.

In other features, the motion system further includes: a first sensor generating an output indicative of at least one of the current reference velocity and the current reference acceleration; and an arbitration module generating an output indicative of at least one of the target velocity and the target acceleration. The profile generation module is configured to receive both the current reference velocity and the current reference acceleration from the first sensor, and to receive both the target velocity and the target acceleration from the arbitration module.

In other features, the profile generation module is configured, when generating the speed profile, to determine whether to generate a transition section to transition from the first nonlinear section to the second nonlinear section.

In other features, the transition section is linear in velocity (e.g., constraint in acceleration). The transition section is included when an acceleration constraint is applied. The transition section is not included when the acceleration constraint is not applied.

In other features, the transition section is linear. The transition section is included when there is a tangential point of the first nonlinear section and the second nonlinear section that is outside of minimum and maximum acceleration constraints. The transition section is not included when there is a tangential point of the first nonlinear section and the second nonlinear section that is inside of the minimum and maximum acceleration constraints.

In other features, the profile generation module is configured to determine the first nonlinear section, the second nonlinear section, and a transition section between the first nonlinear section and the second nonlinear section by: determining a first time of a first point connecting the first nonlinear section to the transition section; determining a second time of a second point connecting the transition section to the second nonlinear section; determining a third time of a third point at an end of the second nonlinear section; and based on a horizon amount of time to reach the target velocity and the first time, the second time and the third time, determining the first nonlinear section, the transition section and the second nonlinear section.

In other features, the profile generation module is configured to generate the speed profile to have a continuous smooth trajectory from the current reference velocity to the target velocity.

In other features, the profile generation module is configured to obtain acceleration constraints and jerk constraints, and to generate a transition section between the first nonlinear section and the second nonlinear section that satisfies the acceleration and the jerk constraints.

In other features, the profile generation module is configured to determine an ending point of a launch trajectory of the speed profile and remain at the target velocity when at the ending point.

In other features, the profile generation module is configured to: generate a linear transition section to transition from the first nonlinear section to the second nonlinear section.

In other features, the vehicle motion control module is configured to generate an acceleration constraint and a jerk constraint based on status of vehicle hardware; and the profile generation module is configured to generate the speed profile based on the acceleration constraint and the jerk constraint received from the vehicle motion control module if the constraints are more restricted than those from the arbitration module.

In other features, the vehicle motion control module is configured to control the one or more actuators such that the vehicle moves according to the speed profile.

In other features, a motion request and control system for a vehicle. The method includes: obtaining a current reference velocity, a current reference acceleration, a target velocity and a target acceleration for the vehicle; based on the current reference velocity, current reference acceleration, target velocity and target acceleration, as well as acceleration constraints (e.g., minimum and maximum constraints) and jerk constraints (e.g., minimum and maximum constraints), generating a speed profile including determining a first nonlinear section and second nonlinear section of the speed profile, where the first nonlinear section is associated with acceleration, wherein the second nonlinear section is associated with deceleration, and where the speed profile includes acceleration of the vehicle from the current reference velocity to the target velocity; and based on the speed profile, to control one or more actuators such that the vehicle moves according to the speed profile.

In other features, the first nonlinear section is a first quadratic function and the second nonlinear section is a second quadratic function different than the first quadratic function.

In other features, the method further includes: generating an output indicative of at least one of the current reference velocity and the current reference acceleration via a first sensor; generating an output indicative of both the target velocity and the target acceleration via an arbitration module; receiving the current reference velocity and the current reference acceleration from the first sensor; and receiving both the target velocity and the target acceleration from the arbitration module.

In other features, the method further includes, when generating the speed profile, determining whether to generate a transition section to transition from the first nonlinear section to the second nonlinear section.

In other features, the method further includes determining the first nonlinear section, the second nonlinear section, and a transition section between the first nonlinear section and the second nonlinear section by: determining a first time of a first point connecting the first nonlinear section to the transition section; determining a second time of a second point connecting the transition section to the second nonlinear section; determining a third time of a third point at an end of the second nonlinear section; and based on a horizon amount of time to reach the target velocity and the first time, the second time and the third time, determining the first nonlinear section, the transition section and the second nonlinear section.

In other features, the method further includes: obtaining acceleration constraints and jerk constraints; and generating a transition section between the first nonlinear section and the second nonlinear section that satisfies the acceleration and the jerk constraints.

In other features, the method further includes: generating a linear transition section to transition from the first nonlinear section to the second nonlinear section.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
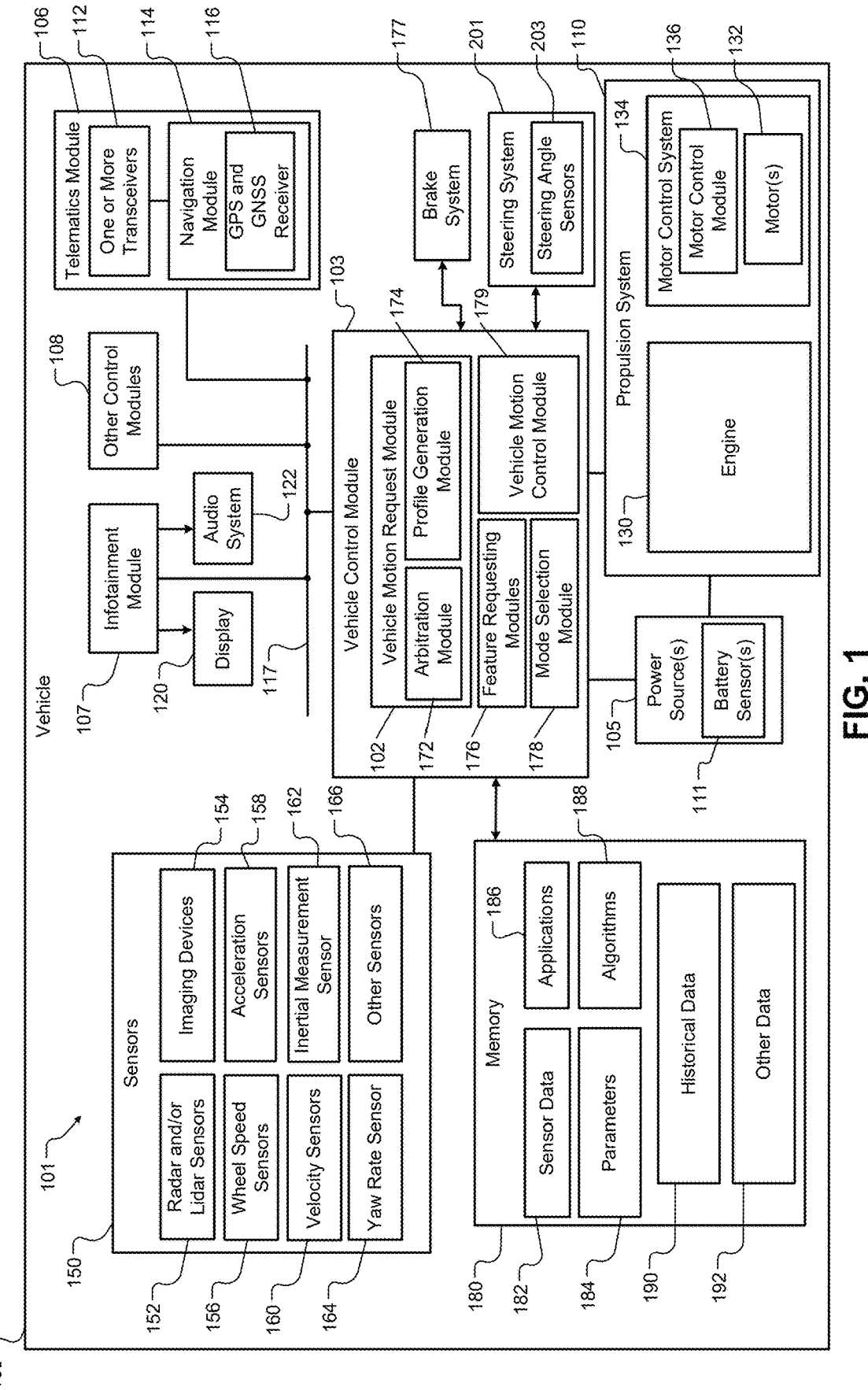
FIG. 1 is a functional block diagram of an example host vehicle including an example speed-based control system including a vehicle motion request module in accordance with the present disclosure.

A host vehicle can include multiple motion requestors that can request, for example, driving at a requested speed. For example, a host vehicle can include a cruise control system, an adaptive cruise control system, a hands-free driving system, a one-pedal drive system, or other motion requesting system. A host vehicle can also include devices receiving driver acceleration requests, such as an accelerator pedal sensor detecting position of an accelerator pedal and mapping it to a desired acceleration based on vehicle technical specification (VTS). Each of these motion requests can be provided to a controller in the form of a speed (or velocity) request. The driver acceleration or torque requests may be converted to speed requests. A vehicle may include any number of motion control systems generating respective speed requests.

One example implementation for handling the speed requests includes converters that respectively convert the speed requests to torque requests. When multiple requests are received concurrently, an arbitrator performs arbitration functions to determine which of the one or more requests to satisfy. A torque profile generator then generates a torque profile to follow based on the one or more requests being satisfied. A controller controls a plant of the vehicle based on the torque profile. The plant may include one or more motors and/or an engine. Sensors detect states of the plant and outputs of the sensors (e.g., vehicle motions) are then used as feedback to adjust the requested torque profile and/or control of the plant to satisfy the one or more requests.

The stated implementation has associated drawbacks. For example, each requestor may have its own unique request format and a respective converter and closed loop control for controlling the plant. Thus, the same operations are performed multiple times and multiple sets of vehicle models and open or closed loop controllers are used when every requestor prepares its own torque requests for arbitration. There are also inefficiencies and inaccuracies in converting target vehicle motion (or speed requests) to total vehicle torque. The conversions and control have high associated control design, coding, testing, deploying, maintaining, calibrating and thus engineering costs, as well as high hardware RAM, ROM throughput consumption. There can also be inconsistent performance associated with the requests if all of the models and the same type of controllers are not identical, which can result in poor drive quality, especially when switching between different request types. In addition, acceleration response maps such as a target acceleration response map (ARM) and a target transit acceleration response map (tARM, which can also be called target jerk response map (JRM)) and corresponding performance metrics must be converted to axle torque for use in a driver torque request system. An acceleration response map, also referred to as a vehicle speed horizon, defines a target speed profile curve by zero acceleration An ARM refers to rate of changes in vehicle motion between an initial acceleration period and a deceleration period. A tARM refers to changes in acceleration (or acceleration rates) during the initial acceleration period and changes in acceleration (or acceleration rates) during the deceleration period. In certain instances, a tARM may not be utilized and only a pre-ARM for the initial acceleration period and a post-ARM for the deceleration period are utilized. The pre-ARM refers to different ARM values for initial and final stages of acceleration. The stated implementation also requires a known and accurate vehicle mass, which can compromise performance.

There is also complexity in converting acceleration-based performance targets to axle torque before arbitrating all the torque requests. Traditional motion request systems operate based on torque-based requests and exhibit duplicative conversions from acceleration to torque in off-line or real-time fashion. When the conversions occur in an off-line fashion, they lose the capability of compensating for the changes of road/ambient conditions (e.g., road grade, road surface frictions, and wind direction and strength), and vehicle properties (e.g., vehicle mass, tire radius, drag coefficient). Regardless the conversions operate in in off-line or real-time fashion, each torque requestor may need to use a dynamic vehicle model and open-loop or closed-loop controller to convert the desired vehicle motion to axle torque. Therefore, a vehicle can include multiple dynamic vehicle models and/or open-loop and closed-loop controllers implementing respective platforms having corresponding algorithms and calibrations. The conversions can occur at the multiple vehicle models and/or controllers. Potentially, the duplicated efforts on designing, coding, testing, deploying, and maintaining the dynamic vehicle model and any specific type of open-loop and closed-loop controller may results in significant waste on engineering resource and resources of embedded control modules (e.g., RAM, ROM, and throughput). Calibration effort and errors can occur by having duplicative similar calibrations performed, which can provide conflicting results.

The examples set forth herein include a vehicle longitudinal motion request architecture for providing motion requests and constraints based on requests from multiple requestors. Although the following examples are primarily described with respect to longitudinal motion requests, speeds, accelerations, jerks, etc., the examples are also applicable to lateral motion requests, speeds, accelerations, jerks, etc. Current torque-based architectures are inefficient, complex, not robust, have associated redundancies, and expensive to calibrate. The examples disclosed herein include receiving speed requests and constraints from multiple requestors. A requestor refers to a vehicle motion requesting system, such as a cruise control system, an adaptive cruise control system, a hands-free driving system, a one-pedal drive system, or other motion requesting system. A requestor may also refer to a driver torque requesting device or module, such as an acceleration module generating a speed request signal based on a position of an accelerator pedal. The constraints include acceleration constraints and jerk constraints. The acceleration and jerk constraints may include acceleration and jerk limits that are not to be exceeded. The disclosed architecture includes a supervisory control layer that feeds back achieved behavior, hardware constraints, and detected failures to the requestors, an arbitration module, and a profile generation module, as further described below.

The examples set forth herein further include a profile generation module that is configured to construct motion horizons (i.e., velocity reference profiles of the motions to follow). In an embodiment, velocity/speed, acceleration, and jerk profiles are generated. In an embodiment, a vehicle velocity/speed horizon (or velocity/speed profile) is generated having a particular format and using target velocity and motion constraints (e.g., acceleration maximum and minimum constraints, and jerk maximum and minimum constraints). This particular format provides an efficient method to generate vehicle motion profiles/horizons with minimized random access memory (RAM), read-only memory (ROM), and throughput consumption, and provides sufficient motion reference information for a variety types of control methods (e.g. proportional-integral-derivative (PID), linear quadratic regulator (LQR), and model predictive control (MPC)). The velocity and motion constraints (e.g., acceleration constraints and jerk constraints) can be obtained from a vehicle technical specification, online request modules, or via local and/or remote inputs. The examples eliminate the inefficiency (e.g., duplicated conversions using duplicated vehicle model and duplicated control methods) of converting acceleration and jerk metrics to axle-torque and thereby reducing algorithm and calibration efforts.

FIG. 1 shows a host vehicle 100 including an example speed-based control system 101 including a vehicle motion request module 102. The speed-based control system 101 includes a vehicle control module 103 implementing the vehicle motion request module 102. The vehicle motion request module 102 as described further below generates motion requests and constraints based on motion requests and constraints received from multiple requestors. As an example, the motion requests may include speed, acceleration, and jerk requests, and the constraints may include speed, acceleration and jerk constraints. The modules 102, 103 may perform various operations based on interaction with a driver of the host vehicle 100. The vehicle control module 103 may perform autonomous operations based on the interaction including responses received from the driver.

The vehicle 100 further includes one or more power sources 105, a telematics module 106, an infotainment module 107, other control modules 108 and a propulsion system 110. The vehicle control module 103 may control operation of the vehicle 100 and the modules 102, 106, 107, 108 and the propulsion system 110. The power sources 105 may include one or more battery packs, a generator, a converter, a control circuit, terminals for high and low voltage loads, etc., as well as one or more battery sensors 111 for detecting states of the power sources 105 including voltages, current levels, states of charge, etc.

The telematics module 106 provides wireless communication services within the vehicle 100 and wirelessly communicates with service providers, back offices, central offices, cloud-based networks, businesses, and devices external to the vehicle 100. The telematics module 106 may support Wi-Fi®, Bluetooth®, Bluetooth Low Energy (BLE), near-field communication (NFC), cellular, legacy (LG) transmission control protocol (TCP), long-term evolution (LTE), and/or other wireless communication and/or operate according to Wi-Fi®, Bluetooth®, BLE, NFC, cellular, and/or other wireless communication protocols. The telematics module 106 may include one or more transceivers 112 and a navigation module 114 with a global positioning system (GPS) and GNSS (or Global Navigation Satellite System) receiver 116. The transceivers 112 wirelessly communicate with network devices internal and external to the vehicle 100 including cloud-based network devices, central stations, back offices, and portable network devices. The transceivers 112 may perform pattern recognition, channel addressing, channel access control, and filtering operations.

The navigation module 114 executes a navigation application to provide navigation services. The navigation services may include location identification services to identify where the vehicle 100 is located. The navigation services may also include guiding a driver and/or directing the vehicle 100 to a selected location. The navigation module 114 may communicate with a central station to collect map information indicating levels of traffic, transportation object identification and locations (e.g., locations and types of signs), path information, locations of turns, lane identification, ramp locations, etc. As an example, if the vehicle 100 is an autonomous vehicle, the navigation module 114 may direct the vehicle control module 103 along a selected route to a selected destination. The GPS and GNSS receiver 116 may provide vehicle state measurement information such as velocity and/or direction (or heading) of the vehicle 100 and other vehicles and objects (e.g., pedestrians and cyclists) and/or global clock timing information. The GPS and GNSS receiver 116 may generate a GPS signal that is provided to the vehicle control module 103. The GPS signal and the corresponding vehicle state measurement information when received at the vehicle control module 103 may be delayed (i.e., have associated lag).

The infotainment module 107 may include and/or be connected to an audio system 122 and/or a video system including one or more displays (one display 120 is shown). The display 120 and audio system 122 may be part of a human machine interface. The displays may include cluster and/or center console displays, head-up displays, etc. Messages may be displayed, audibly played out, and/or indicated via the display 120, the audio system 122, and/or via one or more other output devices. The infotainment module 107 may provide various proactive messages and information. The infotainment module 107 may, for example, guide a vehicle operator to a certain location, around a turn, to change lanes, and/or display other information.

The propulsion system 110 may include one or more torque sources, such as one or more motors and/or one or more engines (e.g., internal combustion engines). In the example shown in FIG. 1, the vehicle 100 includes an engine 130 and one or more motors 132. The torque sources are independently controlled. The propulsion system 110 includes a motor control system 134 that includes the one or more motors 132 and a motor control module 136 that may control operation of the one or more motors 132 based on signals from the vehicle control module 103.

The modules 102, 103, 107, 108 may communicate with each other via one or more buses 117, such as a controller area network (CAN) bus and/or other suitable interface. The vehicle control module 103 may control operation of vehicle modules, devices and systems based on feedback from sensors 150.

The sensors 150 may include exterior sensors, interior sensors, vehicle state sensors, and other sensors. For example, the sensors 150 may include, as shown, radar and/or lidar sensors 152, exterior imaging sensors (e.g., cameras) 154, wheel speed sensors 156, acceleration sensors (e.g., longitudinal and lateral acceleration sensors) 158, velocity sensors (e.g., longitudinal and lateral velocity sensors) 160, an inertial measurement sensor 162, a yaw rate sensor 164, and other sensors 166. The other sensors 166 may include wheel angle sensors and/or other vehicle state sensors and/or motion detection sensors.

The exterior sensors may be used to detect objects external to the vehicle 100 and/or in a path of the vehicle 100. The interior sensors may include interior imaging sensors (e.g., cameras) and a microphone or microphone array, which may be used to monitor physical activity, eye movement, and/or gaze direction of a driver and/or to interact with the driver. The interior sensors may also be used to detect gestures made by the driver, detect orientation of a body of the driver, detect speech of the driver, etc.

The vehicle motion request module 102 may include an arbitration module 172 and a profile generation module 174. The vehicle control module 103 may further include feature requesting modules (or requestors) 176, a mode selection module 178, and a vehicle motion control module 179. The arbitration module 172 performs arbitration operations to determine which motion requests to satisfy, as further described below with respect to FIGS. 2-3. The profile generation module 174 generates motion requests (or profiles) and constraints based on the output of the arbitration module 172. The motion requests may include a generated (or target) profile of a vehicle state (e.g., a target profile of vehicle velocity). The vehicle motion control module 179 controls actuators (e.g., the engine 130, motors 132, the brake system 177, etc.) of the vehicle based on the motion requests and constraints generated by the profile generation module 174. Although the modules 102 and 179 are shown as being implemented by the same vehicle control module (or controller) 103, the modules 102 and 179 may be implemented by separate control modules (or controllers).

The mode selection module 178 may select a vehicle operating mode. As an example, the vehicle control module 103 may operate in a fully or partially autonomous mode and may control the propulsion system 110, a brake system 177, and a steering system 201. The steering system 201 includes a steering wheel angle sensor 203. In an embodiment, the vehicle control module 103 controls operation of the systems 101, 110, 177 and 201 based on interactions with a vehicle occupant (or driver). The vehicle control module 103 may i) perform autonomous operations such as steering, braking, accelerating, etc., and/or ii) display and/or audibly playout messages and/or output messages and/or corresponding signals via other output devices.

The vehicle 100 may further include the memory 180. The memory 180 may store sensor data 182, parameters 184, applications 186, algorithms 188, historical data 190, and other data 192. The parameters may include, for example, sensor parameters and data from the sensors 150. The applications 186 may include applications executed by the modules 102, 103, 107, 108.

Although the memory 180 and the vehicle control module 103 are shown as separate devices, the memory 180 and the vehicle control module 103 may be implemented as a single device. The memory 180 may also store historical data 190 and other data 192 such as driver driving patterns, data collected by and/or generated by the modules 102, 103, traffic data, navigation data, map data, GPS data, path data, sensor data, etc.

The vehicle control module 103 may control operation of the propulsion system 110, the video system including the display 120, the audio system 122, the brake system 177, the steering system 201, and/or other devices and systems according to parameters set by the modules 102, 103, 107, 108. The vehicle control module 103 may set at least some of the parameters based on signals received from the sensors 150.

The vehicle control module 103 may receive power from the power sources 105, which may be provided to the propulsion system 110, the brake system 177, the steering system 201, etc. Power supplied to the motors 132, the brake system 177, the steering system 201, and/or actuators thereof may be controlled by the vehicle control module 103 to, for example, adjust: motor speed, torque, and/or acceleration; braking pressure; steering wheel angle; pedal position; etc. This control may be based on the outputs of the sensors 150, the navigation module 114, the GPS and GNSS receiver 116 and the data and information stored in the memory 180.

The modules 102 and/or 103 may determine various parameters including vehicle speeds and accelerations, yaw rate, inertial momentum, wheel angles, steering wheel angle, a gear state, an accelerator position, a brake pedal position, and/or other information. The modules 102, 103 may further determine lane boundaries, lane locations, road locations, turn locations, speed limits, object locations, environmental conditions, etc.

Figure 2:
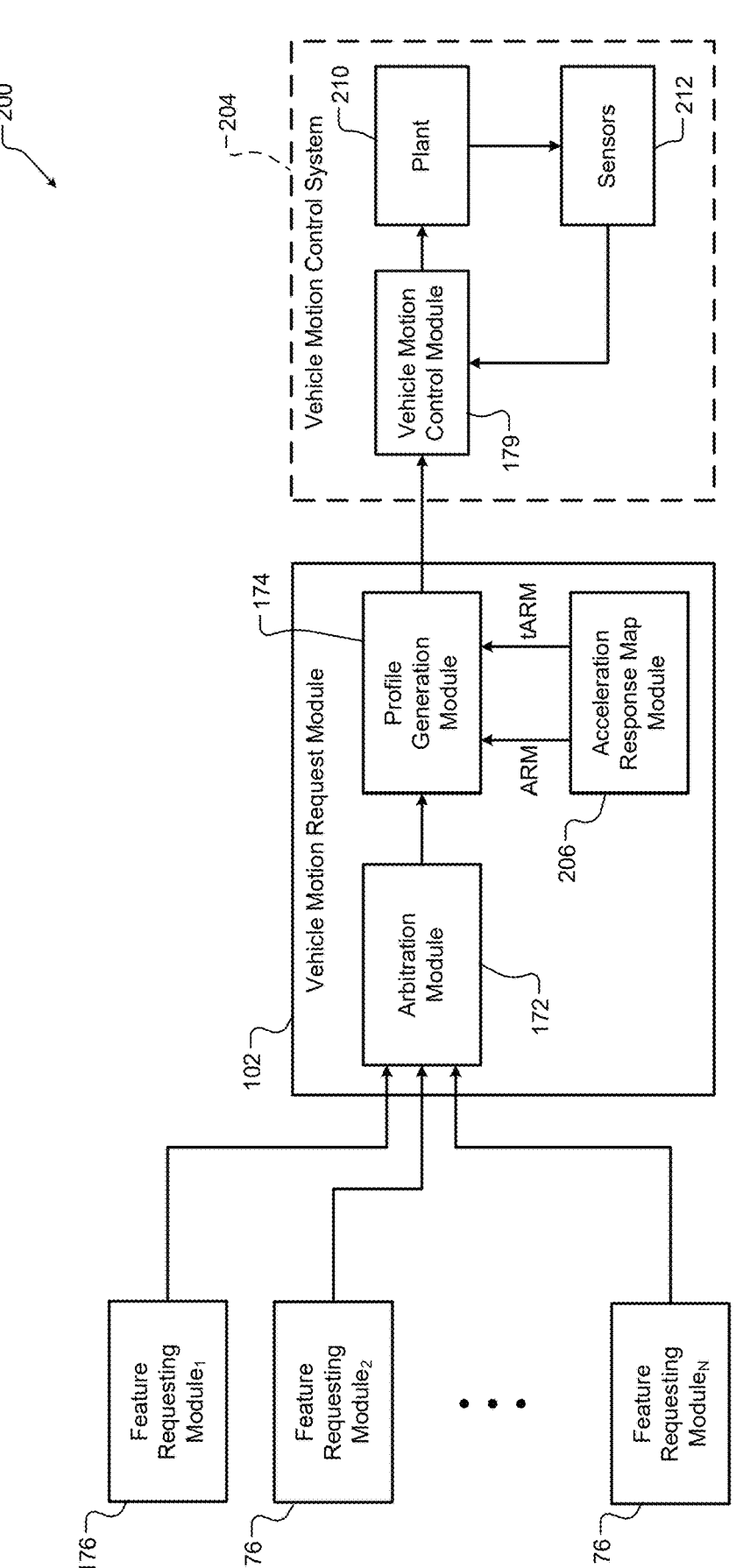
FIG. 2 is a functional block diagram of an example vehicle longitudinal motion request and control (or speed-based control) system including an arbitration module and a profile generation module in accordance the present disclosure.

FIG. 2 shows a vehicle longitudinal motion request and control (or speed-based control) system 200 that includes the feature requesting modules (or motion requestors) 176, the vehicle motion request module 102 (or final motion reference request), and a vehicle motion control system 204. Although the system 200 is primarily described with respect to longitudinal requests and control, the system 200 is also configured for lateral motion requests and control. The requestors 176 may be, for example, a cruise control system requestor, an adaptive cruise control system requestor, a hands-free driving system requestor, a one-pedal drive system requestor, or other motion system requestor. The requestors 176 may also be a driver acceleration requestor. Each of the requestors 176 provides a speed (or velocity) request and acceleration and jerk constraints to the arbitration module 172. The driver acceleration requestor converts a driver acceleration request to a speed request, as well as acceleration and jerk constraints, which is provided to the arbitration module 172.

The arbitration module 172 arbitrates motion requests (e.g., speed requests) received from the feature requesting modules 176 and generates a resultant (or final) motion request, which is provided to the profile generation module 174. This arbitration is further described below. The vehicle motion request module (or system) 102 further includes an acceleration response map module 206 that generates an ARM and a tARM (or JRM—jerk response map), which include global limits, indicate acceleration and deceleration behavior vehicle should follow, and are provided to the profile generation module 174. The profile generation module 174 generates a profile request (e.g., a speed request over a horizon), which is provided to the vehicle motion control module 179 of the vehicle motion control system 204. The vehicle motion control module 179 controls operation of a plant 210 based on the profile request and selected control methods (e.g. open-loop controller, PID controller, and MPC controller). One or more sensors 212 monitor states of the plant 210 and provide feedback information to the vehicle motion control module 179. In an embodiment, the one or more sensors 212 provide a feedback value to the vehicle motion control module 179, which adjusts the torque requests based on the speed error (e.g. the difference between profile request and the feedback value). In an embodiment, the vehicle motion control module 179 implements a single vehicle model. The sensors 212 may include a vehicle speed sensor, motor and/or engine speed sensors, wheel speed sensors, etc.

In an embodiment, each of the feature requesting modules 176 provides a respective speed request, and/or acceleration and jerk constraints, which may all be in the same format. The vehicle motion control system 204 operate as a single global set of open and closed loop controllers for respective features being implemented. This simplifies design, coding, testing, deploying, maintaining, calibration, and engineering costs and improves hardware RAM, ROM, and throughput of the vehicle longitudinal motion request and control system 200. The described system provides consistent performance among all requests with one global vehicle model and one global set of open and closed loop controllers for better drive quality, especially when switching between different request types.

Figure 3:
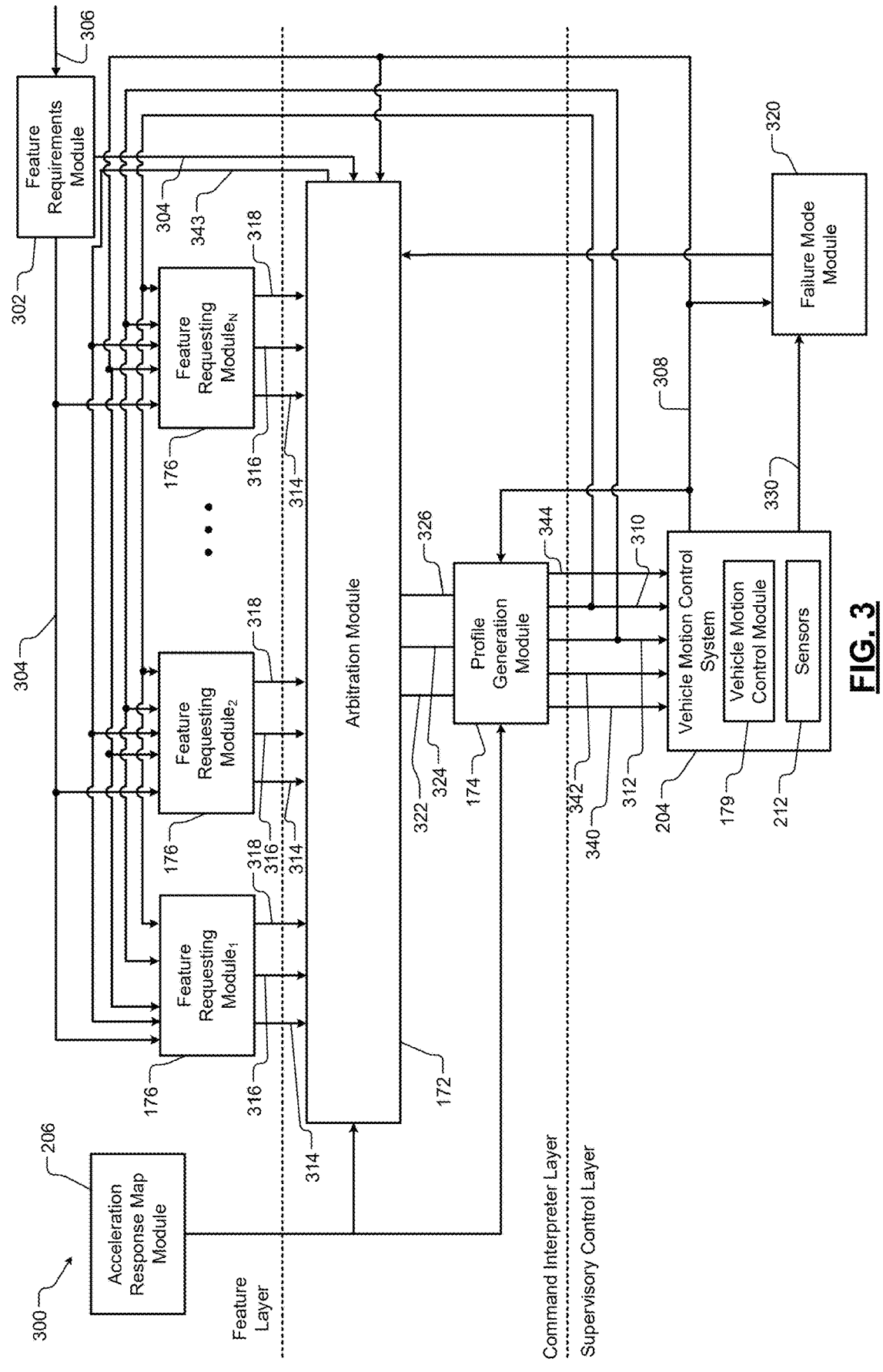
FIG. 3 is a functional block diagram of an example vehicle motion request and control system including an arbitration module, a profile generation module and a vehicle motion control system in accordance with the present disclosure.

FIG. 3 shows a vehicle motion request and control system 300 that includes a feature layer, a command interpreter layer, and a supervisory control layer. The feature layer includes the feature requesting modules 176, the acceleration response map module 206, and a feature requirements module 302. The feature requesting modules 176 receive feature requirements 304 from the feature requirements module 302. As a few examples, the feature requirements may include a set (or reference, target) speed, a one-pedal drive deceleration rate or acceleration rate as a function of acceleration pedal and speed, a brake pedal based deceleration rate, an autonomous control request, etc. The feature requirements may be generated and/or determined based on driver inputs 306, which may also contain source of acceleration and jerk constrains for each feature requesting model 176, motion request major priority level and minor priority levels of 176. The feature requesting modules 176 may further receive response from vehicle motion request module 102, response 308, which contains types of honored, partially honored (actuator range constrained with type and value), rejected (lost arbitration, propulsion actuator failures), from vehicle motion control system 204 (e.g., hardware constraints), and other constraints such as an acceleration constraint 310 and a jerk constraint 344 generated by the profile generation module 174. The feature requesting modules 176 generate motion requests (e.g., speed requests) 314 and constraints, such as acceleration constraints 316, and jerk constraints 318 based on the feature requirements 304, the response 343 to all the requestors based on the decision made by arbitration module 172, the response 308, the acceleration constraint 310 and the jerk constraint 344 from the vehicle motion control module 179. The response 308 may include, for example, maximum and minimum available torque for the available torque sources, maximum and minimum acceleration and/or deceleration values, maximum and minimum jerk values, maximum and minimum velocities, etc. The response 308 may indicate when one or more devices (e.g., a motor) is not working or is not working properly and thus limit the amount of available acceleration, deceleration, etc. Similarly, as 308 is the response to the requests of 340, 342, 312, as well as 310 and 344, 343 is the response to all the requestors, 176. Depending on the response 343 (e.g., honored, partially honored, or rejected) the requestors 176 may adjust their motions and constraints accordingly.

The command interpreter layer includes the arbitration module 172, the profile generation module 174. The arbitration module 172 i) determines which motion requests 314 are honored based on the feature requirements 304, reported failures, calibration values and status values, and ii) selects a winner of the considered motion requests and iii) generates an arbitrated motion request (or arbitrate speed request) 322 and corresponding constraints such as an acceleration constraint 324 and jerk constraint 326, which are provided to the profile generation module 174. In an embodiment, the motion request 322, the acceleration constraint 324, and/or the jerk constraint 326 are generated based on the winner of arbitration module 314 and its corresponding motion requests (e.g., speed requests) 314 and constraints, such as acceleration constraints 316, and jerk constraints 318 or an ARM and a tARM from the acceleration response map module 206 instead as specified by Feature Requirements Model 302. The failures may refer to failures with hardware components, such as a failure with a motor or a sensor. The status values may refer to achieved vehicle speed, achieved vehicle acceleration (or deceleration), and/or achieved vehicle jerk.

A failure mode module 320 detects the hardware and software (e.g., sensers, actuators, open or closed loop controllers, embedded control modules, and software implementation) failures and may report the failures along with calibration values and status values to the arbitration module 172. When there is one or more failures, then the arbitration module 172 may determine that one or more features cannot be implemented and thus one or more of the motion requests 314 cannot be satisfied and refrains from honoring the motion requests from the one or more corresponding feature requesting modules 176.

The profile generation module 174, based on the motion request 322, acceleration constraint 324, jerk constraint 326, the outputs of the failure mode module 320, and the response 308, generates a motion request profile 340, an acceleration request profile 342, a jerk request profile 312, an acceleration constraint 310, and a jerk constraint 344. In an embodiment, motion request profile 340, the acceleration request profile 342, the jerk request profile 312, the acceleration constraint 310, and/or the jerk constraint 344 are generated based on the motion request (or arbitrate speed request) 322 and corresponding constraints such as an acceleration constraint 324 and jerk constraint 326 of the winner identified by arbitration module 172, as well as an ARM and a tARM from the acceleration response map module 206 as specified by feature requirements module 302.

As an example, when a driver stops pressing on a brake pedal and starts pressing on an accelerator pedal of the vehicle to request a target speed that is greater than the current vehicle speed, the profile generation module restricts how speed, acceleration, and jerk profiles (or requests) are generated. The profile generation module 174 transitions from decelerating the vehicle to accelerating the vehicle in a smooth manner such that the vehicle does not experience a "clunk" as defined by acceleration constraints 324 and jerk constraint 326. This is an example of when a restriction is made on a generated profile. The restriction can be made through generation of the speed, acceleration and/or jerk profiles and acceleration and jerk constraints.

The supervisory control layer includes the vehicle motion control system 204, which includes the vehicle motion control module 179 and the sensors 212. The vehicle motion control module 179 generates a set of torque requests to all available propulsion actuators and an achieved behavior feedback signal 330 indicating the status values of the entire controlling, actuating, sensing path. The vehicle motion control module 179 may not honor one or more of the received requests and/or one or more of the received constraints. For example, if the vehicle motion control module 179 is operating in a particular mode for which the request and/or constraint is not appropriate, the vehicle motion control module 179 may not satisfy the request and/or constraint. For example, if the vehicle motion control module 179 is operating in a traction control mode, an acceleration request may not be satisfied. If a request and/or constraint is not satisfied, the vehicle motion request module 102 and thus the modules 172, 174 may reset the request and/or constraints. In an embodiment, the vehicle motion control module 179 informs the modules 172, 174 when requests and constraints are satisfied and/or are not satisfied. This indication may be provided by indicating achieved speed, acceleration and jerk or may be directly indicated by signaling whether the requests and/or constraints have been satisfied. These indications may be provided as part of the hardware constraints signal back to one or more of the modules 172, 174 and/or to the modules 176.

Figure 4:
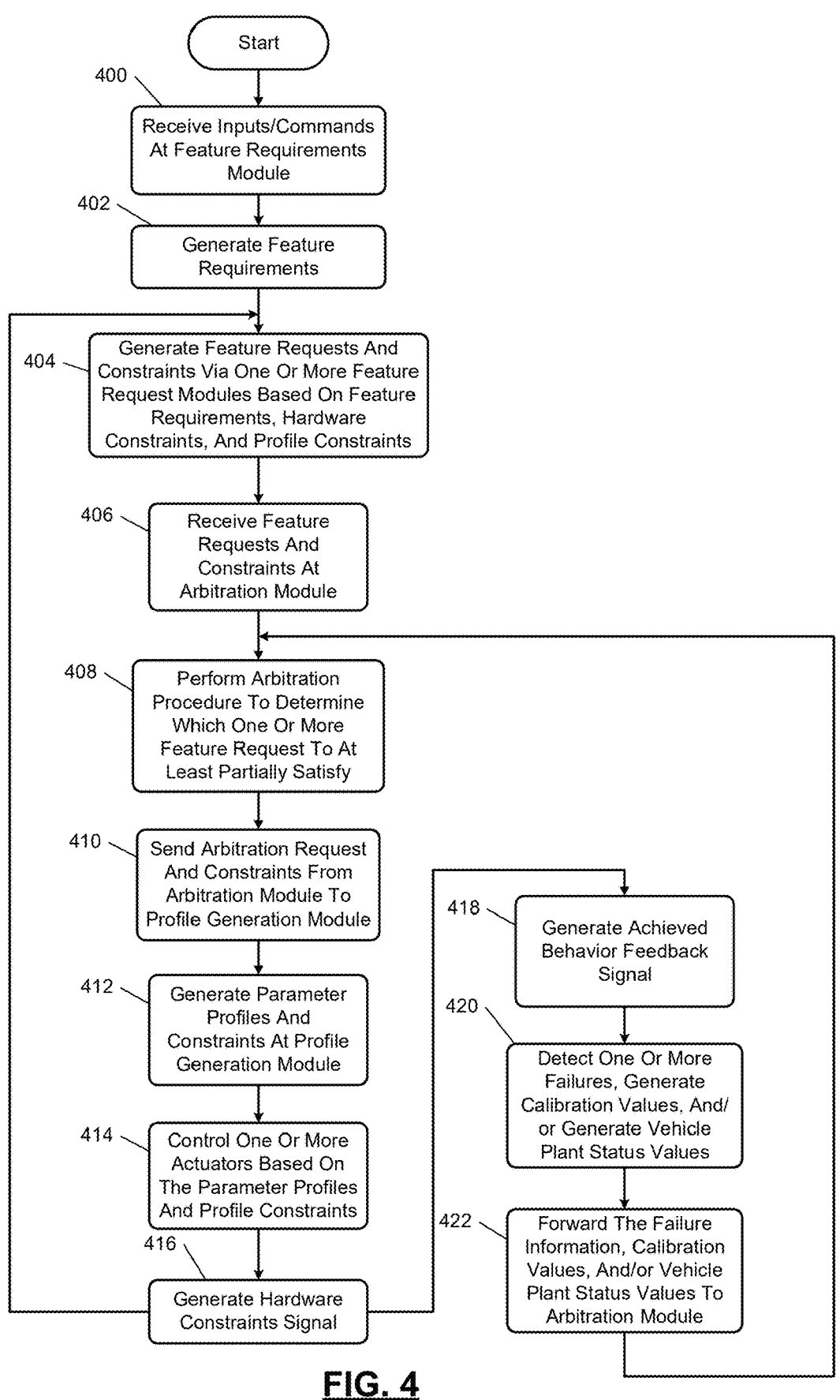
FIG. 4 illustrates an example method for generating motion requests and constraints for a vehicle motion control system in accordance with the present disclosure.

FIG. 4 shows a method for generating motion requests and constraints for a vehicle motion control system (e.g., speed-based control system 200 of FIG. 2). The following operations may be iteratively performed. At 400, the feature requirements module 302 may receive inputs and/or commands, which may be generated based on driver inputs. At 402, the feature requirements module 302 generates feature requirements based on the received inputs.

At 404, one or more of the feature requesting modules 176 generate feature requests and constraints (e.g., acceleration and jerk constraints) based on the feature requirements, hardware constraints, and profile constraints (i.e., constraints generated by the profile generation module 174). The feature requests include motion requests (e.g., speed requests).

At 406, the arbitration module 172 receives the feature requests and constraints generated by the feature requesting module 176.

At 408, the arbitration module 172 arbitrates the received feature requests to determine which one or more feature requests to at least partially satisfy. This is based on output of the feature requirements module 302, the hardware constraints, detected failures, calibration values, achieved vehicle states, and/or the ARM and/or tARM.

At 410, the arbitration module 172 generates a resultant motion (or arbitration) request 322 and resultant constraints (e.g., the acceleration constraint 324 and the jerk constraint 326), which are provided to the profile generation module 174.

At 412, the profile generation module 174 generates i) profile requests for different parameters such as a speed request profile 340, an acceleration request profile 342, and a jerk request profile 312, and ii) profile constraints (e.g., the acceleration constraint 310 and jerk constraint 344).

At 414, the vehicle motion control module 179 controls one or more actuators (e.g., motors, engine, or other propulsion devices) based on one or more of the profile requests including the speed request profile, acceleration request profile, and/or jerk request profile and/or the one or more profile constraints generated by the profile generation module 174. This may be based on the mode of operation and the one or more requestor requests being satisfied. For example, in a speed control mode, the vehicle motion control module 179 monitors a speed request profile, adjusts the one or more actuators based on the difference between speed request profile and measured speed (e.g., speed error), and may not monitor and/or utilize the acceleration request profile and the jerk request profile. The profile constraints may be the same or different than the resultant constraints generated by the arbitration module 172. The profile generation module

174 may modify the resultant constraints generated by the arbitration module 172 and output the modified constraints to the vehicle motion control module 179 as the profile constraints.

At 416, the vehicle motion control module 179 generates a hardware constraints signal including hardware constraints. At 418, the vehicle motion control module 179 monitors vehicle behavior and generates an achieved behavior feedback signal indicating achieved vehicle states.

At 420, the failure mode module 320 detects one or more failures, generates calibration values, and/or generates vehicle plant status values. The vehicle plant status values may include achieved vehicle speed, acceleration and/or jerk, as well as achieved engine and/or motor speeds. The calibration values may include motor and/or engine calibration values, such as calibrated voltages, current levels, fuel supply levels, air flow rates, timing information, etc. At 422, the detected failure information, calibration values, and vehicle plant status values are provided to the arbitration module 172. Operation 408 may be performed subsequent to operation 422.

In an embodiment, the above-described feature requesting modules 176 request vehicle behavior as expected speed requests and acceleration and jerk constraints including corresponding vehicle speed horizons. Arbitration of multiple speed requestors is performed based on the feature requirements module 302 through vehicle technical specification, calibration, failure modes, and hardware limitations. Supervisory layer constraint feedback is provided for system comprehension. The feedback information includes hardware limitations, diagnostic status (including a horizon) information. The arbitration module operates based on this information and generates arbitration outputs (or arbitration information).

Supervisory layer trajectory speed feedback may include a future system behavior horizon. The arbitration module reports the "winner" of the arbitration performed to the profile generation module by way of indicating a motion request and corresponding constraints. A brake pedal position may be provided as an input to the feature requirements module 302 and mapped to a vehicle speed request via one of the feature requesting modules. Operations of the described vehicle motion request and control system 300 ensures smooth transitions between speed requestors.

Figure 5:
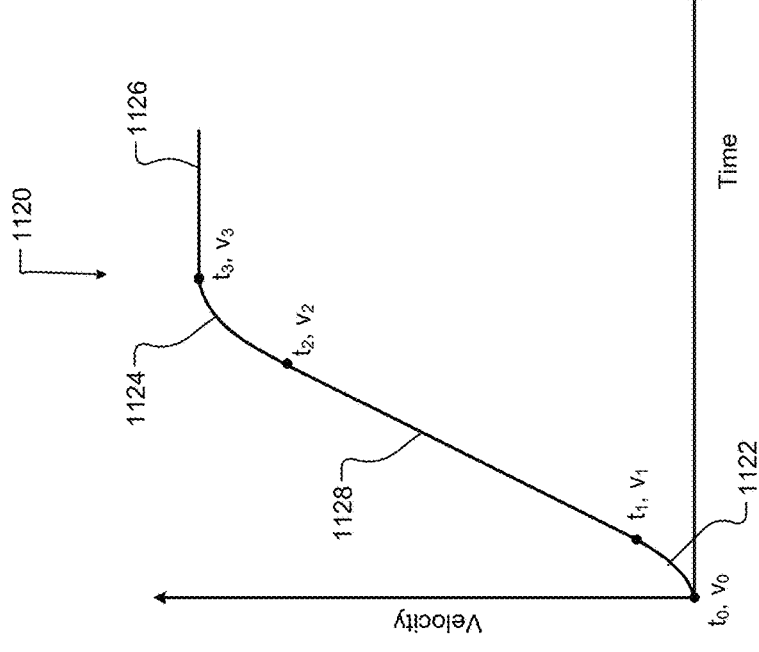
FIG. 5 is a diagram illustrating an example when a speed profile having a particular format is generated based on changes in pedal position and target speed in accordance with the present disclosure.
Figure 5:
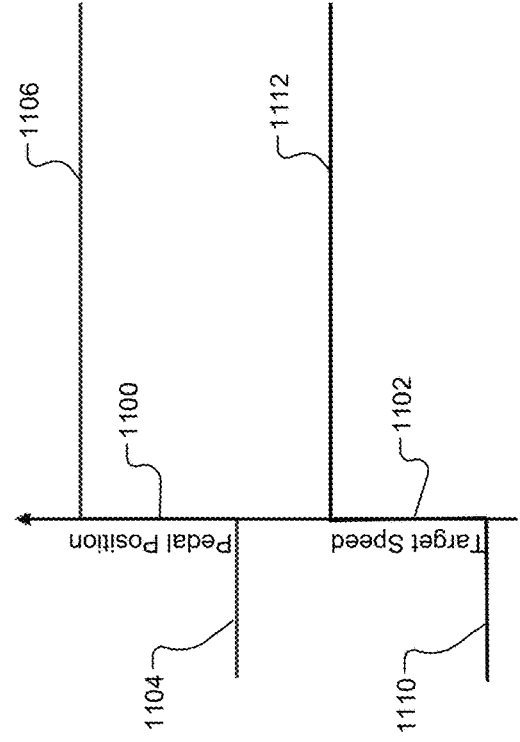

FIG. 5 shows an example diagram for when a speed profile having a particular format is generated based on changes in pedal position and target speed. A pedal position curve 1100 and a target speed curve 1102 are shown. The pedal position curve 1100 is an example illustration of a change in accelerator pedal position. The accelerator pedal position changes from a released state 1104 to a depressed state 1106. The target speed transitions from a LOW (or zero) speed state 1110 to a HIGH (or speed greater than zero) state 1112. The LOW speed state corresponds with the released state 1104 and the HIGH speed state 1112 corresponds with the depressed state 1106.

Due to the change in pedal position and the corresponding change in target speed, a speed (or velocity) profile 1120 is generated. The speed profile 1120 of velocity versus time and includes an initial acceleration (or first nonlinear) section 1122, a deceleration (or second nonlinear) section 1124, and a speed maintaining section 1126. A transition section 1128 may or may not be included between the sections 1122, 1124. The speed profile 1120 is an example of a speed request that may be generated by the profile generation module 174 of FIGS. 1-3. An acceleration request (or profile) may be determined by taking a derivative of the speed profile. A jerk request (or profile) may be determined by taking a derivative of the acceleration request (or profile).

Figure 6:
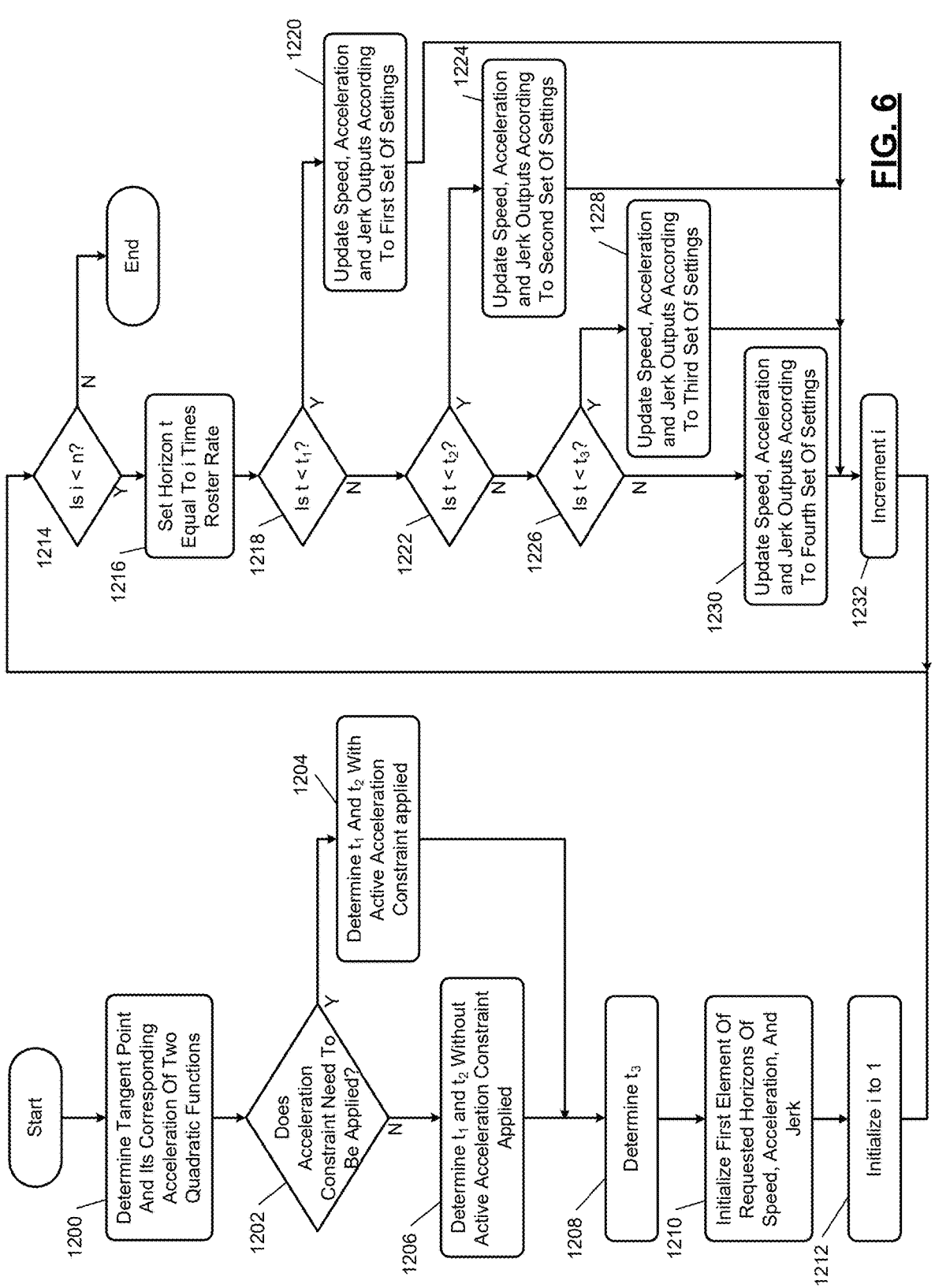
FIG. 6 illustrates a method of generating speed, acceleration and jerk profiles in accordance with the present disclosure.

The acceleration section 1122 extends from a first point at time to and velocity $v_0$ to a second point at time $t_1$ and velocity $v_1$. The transition section 1128 extends from the second point to a third point at time $t_2$ and velocity $v_2$. The deceleration section extends from the third point to a fourth point at time $t_3$ and velocity $v_3$. The method of FIG. 6 provides an example of how times $t_1$, $t_2$, $t_3$ and velocity $v_1$ may be determined. The initial state occurs at $t_0$ and are $v_0$, $a_0$, and $j_0$, where all are known conditions and $v_0$ may be current reference speed or measured speed depending on either closed-loop or open-loop control is selected. The transition state starts at $t_1$ and are $v_1$, $a_1$, and $j_0$, where only $a_1$ is known condition, the maximum/minimum acceleration. The final targeted state occurs starting at $t_3$ and are v3, a3, and $j_3$, where all are known conditions.

Traditionally, a target reference (or parameter) is often expected as a series of references over a target time window (or reference horizon) for more accurate and robust closed-loop controls. The examples disclosed herein provide a method to generate a speed horizon of a vehicle or any controlled moving object with respect to constraints of acceleration (e.g., an ARM) and jerk (e.g., +a tARM). The disclosed examples utilize seven known conditions, $v_0$, $a_0$, $j_0$, $a_1$, $v_3$, $a_3$, and $j_3$, where $v_0$ is the current reference speed, $a_0$ is the current reference acceleration, $j_0$ is the maximum/minimum jerk constraint, $a_1$ is the maximum/minimum acceleration constraint, $v_3$ is the target speed, as is the target acceleration, and $j_3$ is the minimum/maximum jerk constraint. This includes a current reference state including three of the known conditions, which are a current reference vehicle velocity $v_0$, current reference acceleration $a_0$, and current maximum/minimum jerk constraint $j_0$, a transition state including one independent known condition, which is the maximum/minimum acceleration constraint $a_1$, and a target reference state including the other three of the known conditions, which are a target vehicle velocity $v_3$, a target acceleration as, and a target minimum/maximum jerk constraint $j_3$. Two quadratic functions $f_0$ and $f_t$ are determined with provided the know conditions (or current, transit, and target parameter states), $f_0(v_0, a_0, \text{and } j_0)$, $a_1$, and $f_t(v_3, a_3, \text{and } j_3)$. Acceleration constraint, $a_1$, and jerk constraints, $j_0$ and $j_3$, are used to determine the time required to reach the target velocity vs.

In an embodiment, the sections 1122 and 1124 are determined based on the jerk constraints (tARM) and sections 1126 and 1128 are determined based on the acceleration constraint (ARM). The acceleration and jerk constraints (e.g. ARM and tARM) may be provided via and/or based on a vehicle technical specification stored in memory, inputs from upstream Feature Requesting Modules 176, inputs from a remote device in communication with the vehicle, and/or hardware limitations and/or failures obtained from downstream components.

Dual Quadratic Functions for Vehicle Speed Profile

The following examples are applicable for both closed and open loop control of vehicle states including velocity, acceleration and jerk states.

The speed profile 1120 is a twin quadratic function-based vehicle speed profile that includes the three sections 1122, 1128, and 1124, which are connected at time $t_1$ and $t_2$. The first nonlinear section 1122 can be defined as a first quadratic function that is valid for the speed profile between $t_0$ and $t_1$. The transition section 1128 can be defined as a linear function that is valid between $t_1$ and $t_2$ for the speed profile. The second nonlinear section 1124 can be defined as a second quadratic function that is valid between $t_2$ and $t_3$ for the speed profile.

The three sections 1122, 1128 and 1124 respectively have the following characteristics: 1) transitioning from current reference acceleration to a requested maximum/minimum acceleration (constrained by the current jerk constraint), 2) maintaining a maximum/minimum acceleration (constrained by the requested acceleration constraint), 3) transitioning from the requested acceleration to a target acceleration (constrained by a target jerk constraint).

The first quadratic function of the first nonlinear section 1122 that is valid between $t_0$ and $t_1$ for the speed profile may be represented by equation 1 and corresponding acceleration and jerk may be represented by equations 2 and 3, where y is velocity, a is current jerk, b is current reference acceleration, and c is current reference velocity.

$$y = \frac{1}{2} at^2 + bt + c \tag{1}$$

$$y' = at + b \tag{2}$$

$$y'' = a \tag{3}$$

At $t=t_0=0$, the following conditions are known: i) $a=y''_{r0}$, ii) $b=y'_{r0}$, and iii) $c=y_{r0}$.

A linear function of the transition section 1128 that is valid between $t_1$ and $t_2$ for the speed profile may be represented by equation 4. Equation 5 represents the corresponding acceleration, where m is the slope of the linear function.

$$y = mt + d \tag{4}$$

$$y' = m \tag{5}$$

At $t=t_0=0$, it is known that $m=y'_{dsrd}$, where $y'_{dsrd}$ is the requested acceleration constraint.

The second quadratic function of the second nonlinear section 1124 that is valid between $t_2$ and $t_3$ for the speed profile may be represented by equation 6.

Equations 7 and 8 represent the corresponding acceleration and jerk of equation 6.

$$y = \frac{1}{2} ez^2 + fz + g \tag{6}$$

$$y' = ez + f \tag{7}$$

$$y'' = e \tag{8}$$

At $z=0$, the following conditions are known: i) $e=y''_{z0}$, ii) $f=y'_{z0}$, and iii) $g=y_{z0}$, where e is the target jerk, f is target acceleration, and g is target velocity.

A tangent point of the sections 1122 and 1124 at time $t_t$ may be determined using equations 9-12, where equation 9 represents when the two section have the same velocity at $t_t$, equation 10 represents when the two sections 1122, 124 have the same acceleration at $t_t$, and equation 11 represents when a relationship between the coordinate systems of the two quadratic curves of the two sections 1122, 1124. The tangent point of the sections 1122 and 1124 at time $t_t$ may be represented as equation 12.

$$\frac{1}{2} at^2 + bt + c = \frac{1}{2} ez^2 + fz + g \tag{9}$$

$$at + b = ez + f \tag{10}$$

$$z = t - t_3 \tag{11}$$

$$t_t = -\frac{b}{a} \pm \frac{\sqrt{(a-e)(af^2 - eb^2 + 2ae(c-g))}}{a(a-e)} \tag{12}$$

Theorem I: a negative discriminant may be determined if the following condition 1 is met:

$$(a-e)(c-g) > 0 \tag{1}$$

Theorem II: a positive discriminant may be determined if the following condition 2 is met:

$$(a-e)(c-g) < 0 \tag{2}$$

Theorem III: a negative discriminant may be changed to a positive discriminant with following by setting $a=-a$ and $e=-e$.

Theorem IV: for the following possible solutions $t_{t1}$ and $t_{t2}$, it'll be true under all conditions $t_{t1} < t_{t2}$ (see below Proof IV). Therefore $t_{t2}$ is a sole solution that's relevant. Equations 13-15 may represent $t_{t1}$, $t_{t2}$, and $t_t$.

$$t_{t1} = -\frac{b}{a} - \frac{\sqrt{(a-e)(af^2 - eb^2 + 2ae(c-g))}}{a(a-e)} \tag{13}$$

$$t_{t2} = -\frac{b}{a} + \frac{\sqrt{(a-e)(af^2 - eb^2 + 2ae(c-g))}}{a(a-e)} \tag{14}$$

$$t_t = t_{t2} = -\frac{b}{a} + \frac{\sqrt{(a-e)(af^2 - eb^2 + 2ae(c-g))}}{a(a-e)} \tag{15}$$

The profile generation module 174 may determine whether the transition (or linear) section 1128 by performing the following operations. The acceleration at the tangent point may be determined using equation 16.

$$y'_{tt} = at_t + b \tag{16}$$

The requested acceleration is based on a vehicle technical specification (VTS) acceleration response map (ARM) or the acceleration constraint of the honored feature requesting module that is designated as $y'_{dsrd}$. The linear section 1128 is needed if the following condition 3 is true.

$$y'_{tt} > y'_{dsrd} \tag{3}$$

Otherwise, the linear section 1128 is not needed and thus the second 1122 is connected to section 1124 and there is one less section.

When the linear section 1128 is included, the first transition point $t_1$ between the first quadratic function and the linear function may be determined using equations 17-18, given the linear function 1128 is taking the format of equation 19.

$$y'_{dsrd} = at_1 + b \tag{17}$$

$$t_1 = \frac{y'_{dsrd} - b}{a} \tag{18}$$

$$y = y'_{dsrd}t + d \tag{19}$$

At point $t_1$, equations 40 and 41 are satisfied.

$$v_1 = \frac{1}{2}at_1^2 + bt_1 + c = y'_{dsrd}t_1 + d \tag{20}$$

$$d = v_1 - y'_{dsrd}t_1 \tag{21}$$

The second transition point $t_2$ between the second quadratic function and the linear function can be determined using equations 22 and 23.

$$y'_{dsrd} = e(t_2 - t_3) + f \tag{22}$$

$$\frac{1}{2}e(t_2 - t_3)^2 + f(t_2 - t_3) + g = y'_{dsrd}t_2 + d \tag{23}$$

Therefore, equations 24-29 are satisfied since equation 30 is satisfied. Equation 31 is also satisfied.

$$(t_2 - t_3) = \frac{y'_{dsrd} - f}{e} \tag{24}$$

$$t_2 = \frac{\frac{1}{2}e(t_2 - t_3)^2 + f(t_2 - t_3) + g - d}{y'_{dsrd}} \tag{25}$$

$$t_2 = \frac{\frac{1}{2}e\left(\frac{y'_{dsrd} - f}{e}\right)^2 + f\left(\frac{y'_{dsrd} - f}{e}\right) + g - (v_1 - y'_{dsrd}t_1)}{y'_{dsrd}} \tag{26}$$

$$t_2 = t_1 + \frac{\frac{1}{2}e\left(\frac{y'_{dsrd} - f}{e}\right)^2 + f\left(\frac{y'_{dsrd} - f}{e}\right) + g - v_1}{y'_{dsrd}} \tag{27}$$

$$t_2 = t_1 + \frac{\frac{1}{2}(y'_{dsrd} - f)^2 + f(y'_{dsrd} - f) + e(g - v_1)}{ey'_{dsrd}} \tag{28}$$

$$t_2 = t_1 + \frac{\frac{1}{2}\left(y'_{dsrd}{}^2 - f^2\right) + e(g - v_1)}{ey'_{dsrd}} \tag{29}$$

$$y'_{dsrd} = e(t_2 - t_3) + f \tag{30}$$

$$t_3 = t_2 - \frac{y'_{dsrd} - f}{e} \tag{31}$$

When the linear section 1128 is not included, both transition points, $t_1$ and $t_2$ may be determined according to equation 32 while $t_3$ remains the same as when the linear section 1128 is included. This occurs when the transition section 1128 is not included and $v_1 = v_2$.

$$t_1 = t_2 = t_t \tag{32}$$

Proofs I, II, III only consider the condition ae<0. If the discriminant, $(a{-}e)(af^2{-}eb^2{+}2ae(c{-}g)) \geq 0$, $t_{t2}$ is the actual solution since swapping the sign for a and e will cause the discriminant to be a negative value. If the discriminant, $(a{-}e)(af^2{-}eb^2{+}2ae(c{-}g)) < 0$, there are two possibilities identified below as Case I and Case II.

Case I:

$$\begin{cases} (a - e) < 0 \\ \left(af^2 - eb^2 + 2ae(c - g)\right) > 0 \end{cases}$$

$$(a - e) < 0 \text{ means } a < 0 \text{ and } e > 0$$

$$\left(-|a|f^2 - |e|b^2 + 2ae(c - g)\right) > 0$$

$$(2ae(c - g)) > |a|f^2 + |e|b^2$$

$$(2ae(c - g)) > 0$$

$$(c - g) < 0$$

If a and e signs are flipped, then (a–e)>0, or a>0 and e<0 and $$(2ae(c - g)) > |a|f^2 + |e|b^2 > -|a|f^2 - |e|b^2$$

$$(2ae(c - g)) > -|a|f^2 - |e|b^2$$

$$-(2ae(c - g)) < |a|f^2 + |e|b^2$$

$$-(2ae(c - g)) < 0$$

$$(c - g) < 0$$

Case II:

$$\begin{cases} (a - e) > 0 \\ \left(af^2 - eb^2 + 2ae(c - g)\right) < 0 \end{cases}$$

$$(a - e) > 0 \text{ means } a > 0 \text{ and } e < 0$$

$$\left(|a|f^2 + |e|b^2 + 2ae(c - g)\right) < 0$$

$$2ae(c - g) < -|a|f^2 - |e|b^2$$

$$2ae(c - g) < 0$$

If a and e signs are flipped, then (a–e)<0, or a<0 and e>0 and $$(2ae(c - g)) < -af^2 + eb^2$$

$$(2ae(c - g)) < |a|f^2 + |e|b^2$$

Swapping the sign for a and e causes the discriminant to be a positive value.

For Proof IV, it is given a*e<0 under all conditions, then $$a*e - a^2 < -a^2$$

$$a^2 - a*e > a^2$$

$$a(a - e) > a^2$$

$$a(a - e) > 0$$

Therefore, the following will be true under all the conditions:

$$\frac{(a-e)(af^2 - eb^2 + 2ae(c-g))}{a(a-e)} \geq 0$$

$$t_{t2} - t_{t1} = 2\frac{(a-e)(af^2 - eb^2 + 2ae(c-g))}{a(a-e)} \geq 0$$

$$t_{t2} \geq t_{t1}$$

FIG. 6 shows a method of generating speed, acceleration, and jerk profiles. The following operations may be iteratively performed. The method may be performed by the profile generation module 174 of FIGS. 1-3.

At 1200, the profile generation module 174 determines the tangent point and its corresponding acceleration of two quadratic functions. This may be done using equations 33-35.

$$t_t = -\frac{b}{a} + \frac{\sqrt{D}}{a(a-e)} \tag{33}$$

$$v'_{tt} = at_t + b \tag{34}$$

$$D = (a-e)(af^2 - eb^2 + 2ae(c-g)) \tag{35}$$

At 1202, the profile generation module 174 determines whether an acceleration constraint needs to be applied. If yes, operation 1204 is performed, otherwise operation 1206 is performed. An acceleration constraint is applied if $v'_{tt} > v'_{max\_dsrd}$ or $v't_t < v'_{min\_dsrd}$.

At 1204, the profile generation module 174 determines $t_1$ and $t_2$ with the active acceleration constraint applied using equations 36-38.

$$t_1 = \frac{y'_{dsrd} - b}{a} \tag{36}$$

$$v_1 = \frac{1}{2}at_1^2 + bt_1 + c \tag{37}$$

$$t_2 = t_1 + \frac{\frac{1}{2}(y'_{dsrd}{}^2 - f^2) + e(g - v_1)}{ey'_{dsrd}} \tag{38}$$

At 1206, the profile generation module 174 determines $t_1$ and $t_2$ without the active acceleration constraint applied using equation 39, where $t_1 = t_t$ and $t_2 = t_r$.

$$v_1 = \frac{1}{2}at_1^2 + bt_1 + c \tag{39}$$

At 1208, the profile generation module 174 determines $t_3$ using equation 40.

$$t_3 = t_2 - \frac{y'_{dsrd} - f}{e} \tag{40}$$

At 1210, the profile generation module 174 initializes a first element of a requested horizons of speed, acceleration and jerk, where $v''_{dsrd\_hrzn}[0] = v''_{dsrd}$, $v'_{dsrd\_hrzn}[0] = v'_{dsrd}$, and $v_{dsrd\_hrzn}[0] = v_{dsrd}$.

At 1212, the profile generation module 174 initializes i to 1. At 1214, the profile generation module 174 determines if i is less than n, wherein n is a horizon size in time. If i is not less than n, then the method may end, otherwise operation 1216 is performed.

At 1216, the profile generation module 174 sets horizon t equal to i times a roster rate. At 1218, the profile generation module 174 determines if t is less than $t_1$. If yes, operation 1220 is performed, otherwise operation 1222 is performed.

At 1220, the profile generation module 174 updates speed, acceleration, and jerk request outputs according to a first set of settings, as follows where $v''_{dsrd\_hrzn}[1] = a$, $v'_{dsrd\_hrzn}[1] = a*t+b$, and $v_{dsrd\_hrzn}[1] = \frac{1}{2}*a*t*t + b*t + c$.

At 1222, the profile generation module 174 determines if t is less than $t_2$. If yes, operation 1224 is performed, otherwise operation 1226 is performed.

At 1224, the profile generation module 174 updates speed, acceleration and jerk request outputs according to a second set of settings, as follows where $v''_{dsrd\_hrzn}[i] = 0.0$, $v'_{dsrd\_hrzn}[i] = y'_{dsrd}$, and $v_{dsrd\_hrzn}[i] = y'_{dsrd}*(t-t_1) + v_1$.

At 1226, the profile generation module 174 determines if t is less than $t_3$. If yes, operation 1228 is performed, otherwise operation 1230 is performed.

At 1228, the profile generation module 174 updates speed, acceleration and jerk request outputs according to a third set of settings, as follows where $t_{tz} = t - t_3$, $v''_{dsrd\_hrzn}[i] = e$, $v'_{dsrd\_hrzn}[i] = e*t_{tz} + f$, and $v_{dsrd\_hrzn}[i] = \frac{1}{2}*e*t_{tz}*t_{tz}*ft_{tz} + g$.

At 1230, the profile generation module 174 updates speed, acceleration and jerk request outputs according to a fourth set of settings, as follows where $v''_{dsrd\_hrzn}[i] = 0.0$, $v'_{dsrd\_hrzn}[i] = v'_{trgt}$, and $v_{dsrd\_hrzn}[i] = v_{trgt}$.

At 1232, the profile generation module 174 increment i by 1 and then returns to operation 1214.

The above-described examples include a method to compute a continuous/smooth desired reference speed trajectory (a continuous acceleration) when moving away from an initial speed, $v_0$, that adheres to acceleration and jerk constraints (launch trajectory). The method is used every loop in a selected roster.

The method determines how many sections (e.g., starting constant jerk section—section 1, constant acceleration section—section 2, ending constant jerk section—section 3, and constant speed section—section 4) need to construct the profiles/horizons. For a selected horizon size (e.g., 20), a motion profile/horizon may contain different combinations of sections (e.g., section 1 only, section 1 and 2, section 1 and 2 and 3, section 1 and 2 and 3 and 4, section 2 only, section 2 and 3, section 2 and 3 and 4, section 3 only, section 3 and 4, section 4 only) depending on the known conditions for a given loop. The method performs these operations based on received acceleration and jerk constraints from algorithm(s) implemented upstream of where the speed profile calculations are made and uses this information in the trajectory formulation. A horizon of points is determined to achieve target speeds with corresponding acceleration and jerk constraints. The measure applies maximum/minimum jerk constraint in section 1, maximum/minimum acceleration constraint in section 2, minimum/maximum jerk constraint in section 3, and reaches target speed in section 4. Therefore, Time to reach speed target at any given set of known conditions (e.g., $v_0$, $a_0$, $j_0$, $v_3$, as, and $j_3$) is minimized/determined.

The above-described operations of FIGS. 4 and 6 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples include a speed-based architecture that does not need to calibrate requesting features for torque conversions. The architecture is simplified with respect to the number of close loop controlled devices including controller, plant and feedback/sensor devices included for each requestor. The architecture has a single vehicle motion control system with vehicle motion control module, plant and sensors that are used for satisfying requests of multiple requestors.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A motion system for a vehicle, the motion system comprising:

an arbitration module configured to receive a plurality of motion requests from a plurality of requestors, determine which one or more of the motion requests to satisfy and in response generate an output indicative of a target velocity and a target acceleration for the vehicle, wherein each of the plurality of motion requests includes a respective target velocity, a target acceleration, acceleration constraints, and jerk constraints;

a profile generation module configured to obtain a current reference velocity, a current reference acceleration, the target velocity and the target acceleration for the vehicle, and based on the current reference velocity, current reference acceleration, target velocity and target acceleration for the vehicle, to generate a speed profile including determining a first nonlinear section and second nonlinear section of the speed profile, wherein the first nonlinear section is associated with acceleration, wherein the second nonlinear section is associated with deceleration, and wherein the speed profile includes acceleration of the vehicle from the current reference velocity to the target velocity, wherein the profile generation module is configured to i) determine a quantity of different sections to include in the speed profile based on a target velocity, a target acceleration, acceleration constraints, and jerk constraints of a motion request being satisfied, and ii) generating the speed profile to have the determined quantity of different sections; and a vehicle motion control module configured, based on the speed profile, to control one or more actuators of the vehicle.

2. The motion system of claim 1, wherein the first nonlinear section is a first quadratic function and the second nonlinear section is a second quadratic function different than the first quadratic function.

3. The motion system of claim 1, further comprising:

a first sensor generating an output indicative of at least one of the current reference velocity and the current reference acceleration; and the arbitration module generating an output indicative of both the target velocity and the target acceleration, wherein the profile generation module is configured to receive the at least one of the current reference velocity and the current reference acceleration from the first sensor, and to receive both the target velocity and the target acceleration from the arbitration module.

4. The motion system of claim 1, wherein:

the profile generation module is configured, when generating the speed profile, to determine whether to generate a transition section to transition from the first nonlinear section to the second nonlinear section;

the transition section is linear;

the transition section is included when an acceleration constraint is applied; and the transition section is not included when the acceleration constraint is not applied.

5. The motion system of claim 1, wherein:

the profile generation module is configured, when generating the speed profile, to determine whether to generate a transition section to transition from the first nonlinear section to the second nonlinear section the transition section is linear;

the transition section is included when there is a tangential line in common with the first nonlinear section and the second nonlinear section; and the transition section is not included when there is not a tangential line in common with the first nonlinear section and the second nonlinear section.

6. The motion system of claim 1, wherein the profile generation module is configured to determine the first nonlinear section, the second nonlinear section, and a transition section between the first nonlinear section and the second nonlinear section by:

determining a first time of a first point connecting the first nonlinear section to the transition section;

determining a second time of a second point connecting the transition section to the second nonlinear section;

determining a third time of a third point at an end of the second nonlinear section; and based on a horizon amount of time to reach the target velocity and the first time, the second time and the third time, determining the first nonlinear section, the transition section and the second nonlinear section.

7. The motion system of claim 1, wherein the profile generation module is configured to generate the speed profile to have a continuous smooth trajectory from the current reference velocity to the target velocity.

8. The motion system of claim 1, wherein the profile generation module is configured to obtain an acceleration constraint and a jerk constraint, and to generate a transition section between the first nonlinear section and the second nonlinear section that satisfies the acceleration and the jerk constraint.

9. The motion system of claim 1, wherein the profile generation module is configured to determine an ending point of a launch trajectory of the speed profile and remain at the target velocity when at the ending point.

10. The motion system of claim 1, wherein the profile generation module is configured to:

generate a linear transition section to transition from the first nonlinear section to the second nonlinear section, and determine a first ending point of a first launch trajectory of the speed profile having the linear transition section; and determine a second ending point of a second launch trajectory of another speed profile, wherein the another speed profile includes a third nonlinear section and a fourth nonlinear section and does not include a linear transition section to connect the third nonlinear section and the fourth nonlinear section.

11. The motion system of claim 1, wherein:

the vehicle motion control module is configured to generate an acceleration constraint and a jerk constraint based on status of vehicle hardware; and the profile generation module is configured to generate the speed profile based on the acceleration constraint and the jerk constraint received from the vehicle motion control module.

12. The motion system of claim 1, wherein the vehicle motion control module is configured to control the one or more actuators such that the vehicle moves according to the speed profile.

13. The motion system of claim 1, wherein the plurality of requestors comprise a plurality of a cruise control system, an adaptive cruise control system, a hands-free driving system, and a one-pedal drive system.

14. The motion system of claim 1, wherein:
the plurality of requestors and the arbitration module are configured to receive feature requirements;
the plurality of requestors are configured to generate the plurality of motion requests based on the feature requirements; and
the arbitration module is configured to determine the one or more motion requests to satisfy based on the feature requirements, hardware constraints, detected failures, calibration values, achieved vehicle states, and an acceleration response map.

15. The motion system of claim 14, wherein the feature requirements include a set speed, a one-pedal drive deceleration rate or acceleration rate as a function of acceleration pedal position and speed, a brake pedal based deceleration rate, and an autonomous control request.

16. The motion system of claim 1, wherein the profile generation module is configured to generate the speed profile based on: reference velocity and acceleration values; maximum and minimum velocity, acceleration, and jerk constraint values; and target speed and acceleration values.

17. The motion system of claim 1, wherein:
the arbitration module and the profile generation module are configured to receive an acceleration response map;
the arbitration module is configured to determine the one or more motion requests to satisfy based on the acceleration response map; and
the profile generation module is configured to generate the speed profile based on the acceleration response map.

18. A motion request and control method for a vehicle, the method comprising:
receiving a plurality of motion requests from a plurality of requestors;

determining which one or more of the motion requests to satisfy and in response generate an output indicative of a target velocity and a target acceleration for the vehicle, wherein each of the plurality of motion requests includes a respective target velocity, a target acceleration, acceleration constraints, and jerk constraints,
wherein the determining of which of the one or more motion requests to satisfy is based on feature requirements, hardware constraints, detected failures, calibration values, achieved vehicle states, and an acceleration response map;
obtaining a current reference velocity and a current reference acceleration for the vehicle;
based on the current reference velocity, the current reference acceleration, the target velocity and the target acceleration for the vehicle, generating a speed profile including determining a first nonlinear section and second nonlinear section of the speed profile, wherein the first nonlinear section is associated with acceleration, wherein the second nonlinear section is associated with deceleration, and wherein the speed profile includes acceleration of the vehicle from the current reference velocity to the target velocity; and
based on the speed profile, to control one or more actuators such that the vehicle moves according to the speed profile.

19. The method of claim 18, wherein the first nonlinear section is a first quadratic function and the second nonlinear section is a second quadratic function different than the first quadratic function.

20. The method of claim 18, further comprising:
generating an output indicative of at least one of the current reference velocity and the current reference acceleration via a first sensor;
generating an output indicative of both the target velocity and the target acceleration via an arbitration module;
receiving the at least one of the current reference velocity and the current reference acceleration from the first sensor; and
receiving both the target velocity and the target acceleration from the arbitration module.

* * * * *